United States Patent [19]

Kolb et al.

[11] Patent Number: 5,603,799
[45] Date of Patent: Feb. 18, 1997

[54] INSERT FOR USE WITH A TIRE BEAD FORMING APPARATUS

[75] Inventors: Robert W. Kolb; Kenneth B. Turvey, both of Clinton, N.Y.

[73] Assignee: Bartell Machinery Systems Corp., Rome, N.Y.

[21] Appl. No.: 380,712

[22] Filed: Jan. 30, 1995

Related U.S. Application Data

[63] Continuation of Ser. No. 106,081, Aug. 13, 1993, abandoned.

[51] Int. Cl.⁶ ..................................................... B29D 30/48
[52] U.S. Cl. .......................... 156/422; 156/136; 245/1.5
[58] Field of Search ................................ 156/422, 136; 245/1.5; 152/540

[56] References Cited

U.S. PATENT DOCUMENTS

| 1,665,853 | 4/1928 | Leguillon | 156/422 |
| 2,979,109 | 4/1961 | Dieckmann | 156/422 |
| 4,929,292 | 5/1990 | Holroyd et al. | 156/132 |

*Primary Examiner*—Geoffrey L. Knable
*Attorney, Agent, or Firm*—Charles S. McGuire

[57] ABSTRACT

An insert is located in the forming groove of the tire bead former so that the first convolutions of the wire, which form the tire bead, are wound on the insert as the tire bead former is rotated, the insert having an upstanding side portion which defines a space in the inner surface of the formed tire bead which receives the gripped inner terminal end of the wire when the formed tire bead is remove from the tire bead former.

16 Claims, 3 Drawing Sheets

DIRECTION OF ROTATION

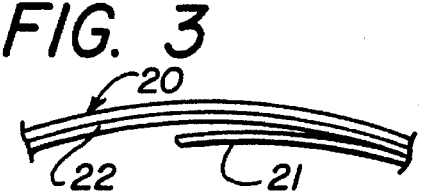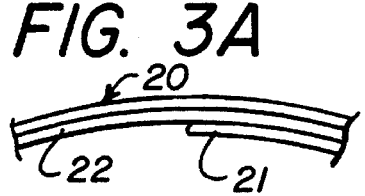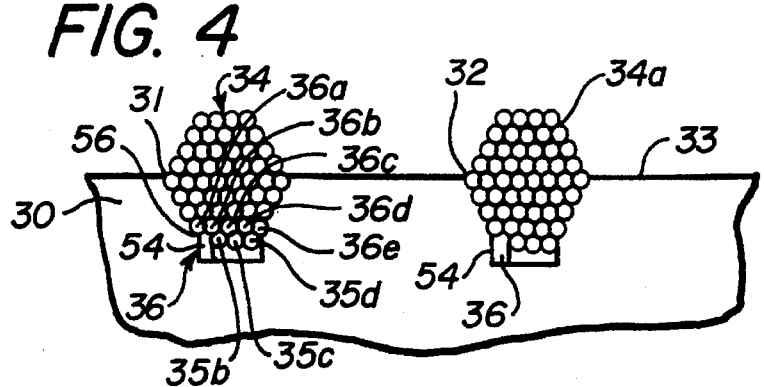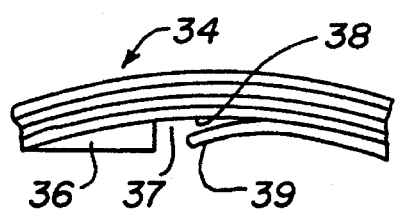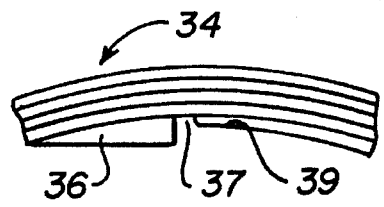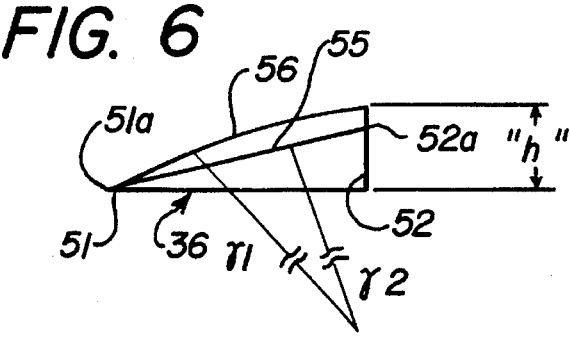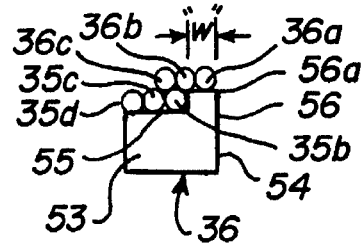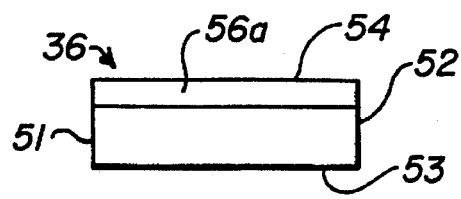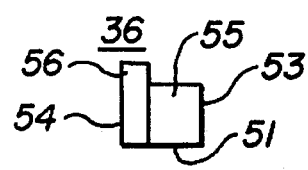

INSERT FOR USE WITH A TIRE BEAD FORMING APPARATUS

This is a continuation of application Ser. No. 08/106,081, filed Aug. 13, 1993, now abandoned.

BACKGROUND OF THE INVENTION

This invention relates to apparatus for forming a tire bead, and more particularly to an insert for use with a tire bead forming apparatus for providing a space in the formed bead for receiving the gripped end of the wire after winding of the tire bead has been completed.

In the manufacture of a tire bead, a collapsible rotatable tire bead former is positioned in a starting position and the leading end of a continuous length of wire is supplied to a gripping apparatus which grips the leading end of the wire. Then, the tire bead former is rotated a predetermined number of revolutions to wind the wire around the tire bead former and thereby form a tire bead having a predetermined number of convolutions. After the predetermined number of convolutions has been wound on the tire bead former, rotation of the tire bead former is stopped and the wound wire is severed from the supply of wire. Then, the tire bead former is collapsed to permit the completed tire bead to be removed from the tire bead former.

To dissipate and eliminate the stress concentration in the wire endings area of the tire bead, various treatments of the wire ends are employed. For example, the wire ends are physically treated such as by flattening, tapering, pointing, softening, or otherwise preventing and eliminating point contact between the wire ends of the individual wires and preferably, the inner surface of the body of the tire bead ring. The means of treating the wire ends include grinding, swagging, machining and heat treating such as wire surface welding, brazing and soldering. However, it is believed that such treatment of the wire ends results in substantial reduction of strength efficiency of the bead ring body, thereby defeating the purpose of the wire end treatment.

It has been observed that when a tire bead is manufactured and placed on an expandable mandrel to measure the breaking load and tensile strength of the finished tire bead structure, the tire bead ring breaks at or closely adjacent to the point whereat the termination ends of the tire bead wire are in contact with the inside surface of the tire bead ring or body. Although the precise mechanism of how the tire bead assembly breaks when a breaking load is applied thereto is unknown, it is believed that the wire termination ends may cut into the surface of the convolutions of wire in the bead assembly or sharply bend the adjacent wires to cause breakage of the bead assembly at the wire termination ends thereof.

SUMMARY OF THE INVENTION

It is an object of the present invention to provide an improved tire bead forming apparatus for forming a tire bead ring having improved breaking load and tensile strength efficiency.

Another object of the invention is to provide an insert for use with a tire bead forming apparatus for forming a tire bead ring which is characterized by improved positioning of the inner termination end of the wound tire bead.

These and other objects are provided by the present invention which provides an insert for use with a tire bead forming apparatus which includes a tits bead former having at least one tire bead forming groove and gripping means for gripping the inner termination end of the supply wire during the bead forming operation.

The insert includes a generally ramp-shaped member located in the forming cavity and having a leading edge oriented in the direction of rotation of the bead former and a trailing edge. The member includes a surface inclined upwardly from its trailing edge to its leading edge with a sidewall portion adjacent to one side of the inclined surface. The member is adapted to be mounted in the bottom of the forming cavity whereby the convolutions of the first layer adjacent to the inner termination end are wound on the member and the sidewall portion defines a void in the inner surface of the wound bead for receiving the gripped inner termination end of the wire after the wound bead has been removed from the bead former.

The invention consists of certain novel features and structural details hereinafter fully described, illustrated in the accompanying drawings, and particularly pointed out in the appended claims, it being understood that various changes in the details may be made without departing from the spirit, or sacrificing and of the advantages of the present invention.

DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages will be readily understood and appreciated.

FIG. 3 is an axial plan view of a tire bead illustrating the inner terminal end of the tire bead in the gripped position during the tire bead winding operation;

FIG. 3A is a view similar to FIG. 3, but illustrating the inner terminal end of the tire bead positioned against the inner surface of the tire bead;

FIG. 4 is a schematic representation of a segment of a collapsible tire bead former including inserts in the forming grooves in accordance with the present invention, and illustrating formed tire beads in the forming grooves;

FIG. 5 is an axial plan view of a tire bead with the inner terminal end in the gripped position and illustrating the void defined by the insert in the inner surface of the tire bead;

FIG. 5A is a view similar to FIG. 5, but illustrating the inner terminal end repositioned to be located in the void;

FIG. 6 is a side elevation view of the insert provided by the present invention;

FIG. 7 is a front elevation view of the insert provided by the present invention;

FIG. 8 is a top plan view of the insert provided by the present invention;

FIG. 9 is a rear elevation view of the insert;

Figure 10:
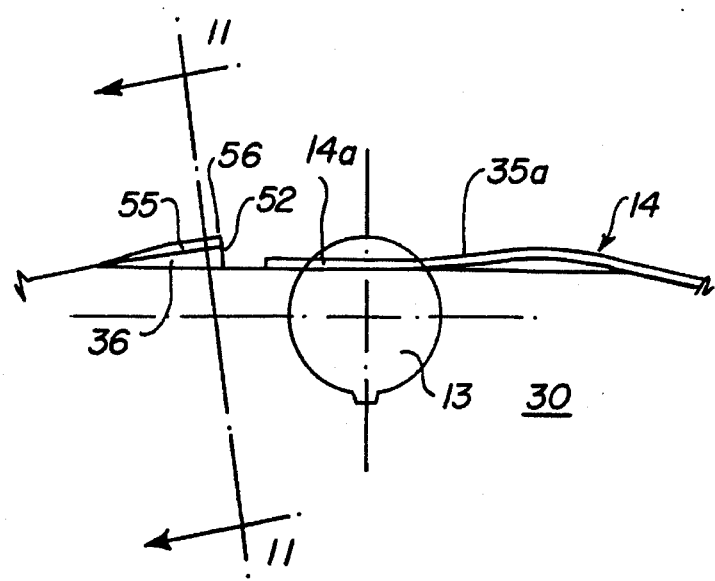
Figure 11:
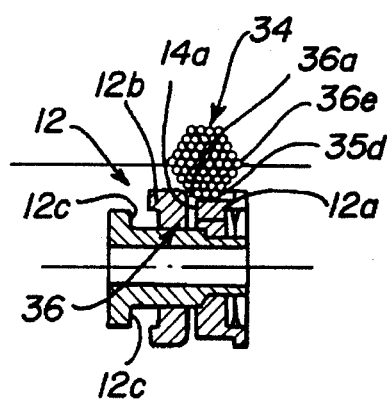
Figure 12:
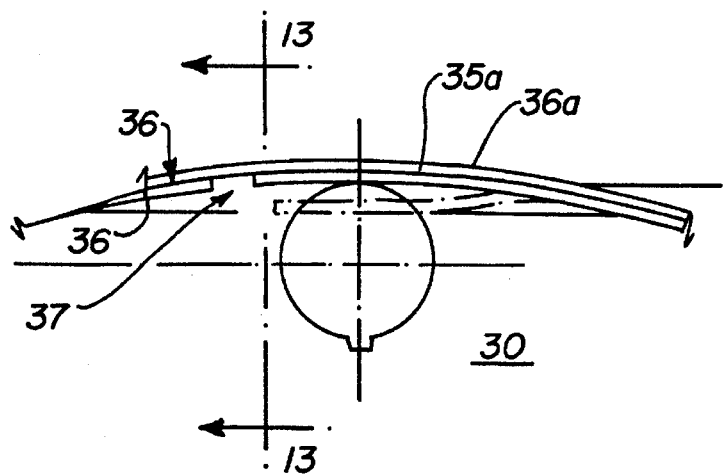
Figure 13:
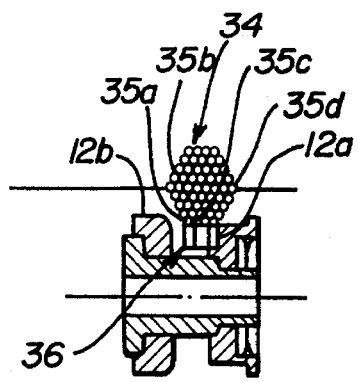

PIG. 10 is a simplified representation of a tire bead former including the insert of the present invention showing the wire inner terminal end of the first convolution positioned to be held by the gripping mechanism;

FIG. 11 is a sectional view taken along line 11—11 of FIG. 10 and illustrating the gripping mechanism and completed tire bead with its inner terminal end held by the gripping mechanism;

FIG. 12 is a view similar to that of FIG. 10 illustrating the second convolution wound on the first convolution and showing the inner terminal end of the wire in the space created by the insert and with the inner terminal end shown in phantom in the position where it was gripped by the gripping mechanism; and FIG. 13 is a sectional view taken along line 13—13 of FIG. 12 and showing a completed tire bead with the wire inner terminal end located in the space created by the insert.

DESCRIPTION OF A PREFERRED EMBODIMENT

Figure 1:
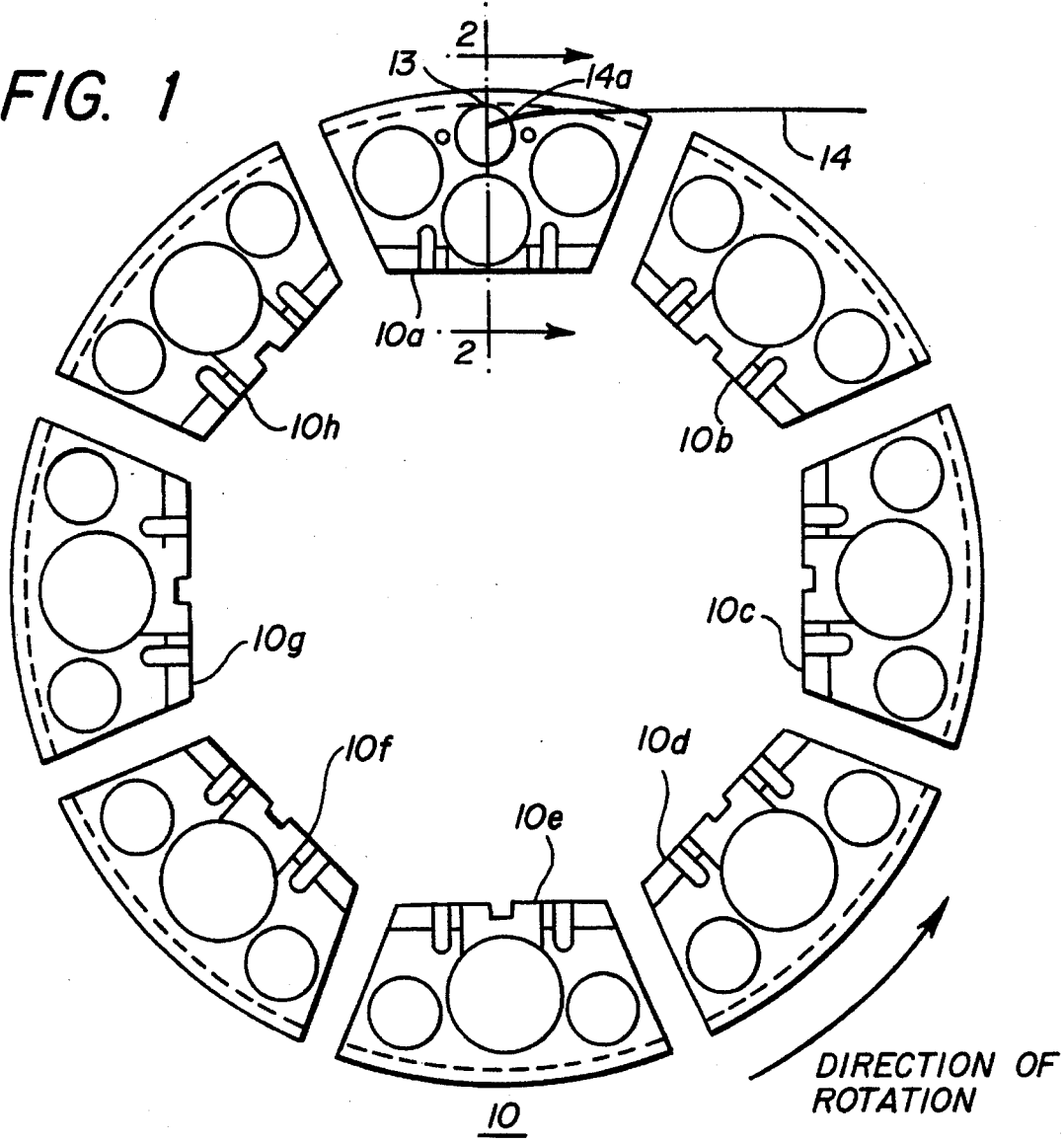
FIG. 1 is a simplified representation of a conventional collapsible rotatable tire bead former.
Figure 2:
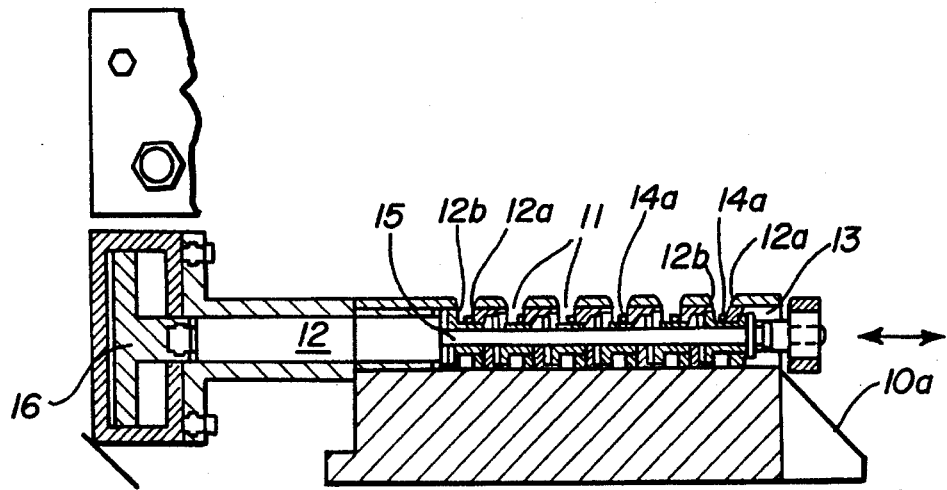
FIG. 2 is a sectional view taken along line 2—2 of FIG. 1 and illustrating the gripping mechanism of the tire bead former.

Referring to the drawings, FIGS. 1 and 2, illustrate a simplified representation of a conventional tire bead former 10 which is used in the manufacture of tire beads. The tire bead former 10 includes a plurality of segments 10a–10h, generally trapezoidal in shape, which are movable radially between extended and retracted positions. When the tire bead former 10 is expanded or in the tire bead forming position as illustrated in FIG. 1, the segments 10a–10h are radially extended and the side of adjacent segments are space apart from one another, providing a maximum outer diameter for the tire bead former. When the tire bead former 10 is collapsed, the segments are in the retracted radially inward until the sides of adjacent segments engage one another providing a minimum outer diameter for the tire bead former, permitting removal of a formed tire bead. The segments are driven between extended and retracted positions by a suitable drive mechanism (not shown) as is known in the art.

Each of the segments includes a plurality of cavities or grooves, such as grooves 11 for segment 10a shown in FIG. 2, in which a continuous length of wire is wound during a tire bead forming operation as is known in the art. One of the segments 10a carries a conventional tubular gripping mechanism 12 which is inserted into an opening 13 in the segment sidewall. The gripping mechanism is located at the base of the grooves 11 in a position to grip and hold the inner terminal ends 14a of a plurality of wires 14 being wound onto the tire bead former 10 during the tire bead winding operation. The gripping mechanism 12 includes a plurality of pairs of jaw members, each pair including a fixed jaw member 12a and a movable jaw member 12b. The movable jaw member 12b is carried by a shaft 15 which is driven by an actuator 16 which may be pneumatic or hydraulic, for example. The movable jaw member 12b is movable between a retracted position shown in FIG. 2, and an extended position shown in FIG. 11.

At the start of a tire bead winding operation, the movable jaw member 12b is operated to the extended or wire gripping position whereat it wedges the inner terminal end of the wire against the fixed jaw. When the tire bead winding has been completed, the movable jaw is operated to the retracted position, releasing the wire inner terminal end to permit the formed tire bead to be removed from the tire bead former. The gripping mechanism 12 defines travel limit stop surfaces 12c (FIG. 11) which limit the axial travel of the movable jaws 12b.

In the manufacture of a tire bead, the collapsible, rotatable tire bead former 10 is positioned in a starting position and in its collapsed condition. The leading end 14a of one or more continuous lengths of wire 14 is applied to the gripping mechanism 12 on the tire bead former which grips the leading end of the wire or wires during the winding operation. Then, the tire bead former 10 is expanded to its bead forming position (FIG. 1) and then rotated a predetermined number of revolutions to wind one or more wires around the tire bead former and thereby form one or more tire beads, each having a predetermined number of convolutions. After the predetermined number of convolutions has been wound on the tire bead former, rotation of the tire bead former is stopped and the wound wire is severed from the supply of wire. Then, the tire bead former is collapsed, permitting the completed tire bead to be removed from the tire bead former.

One of the problems encountered with known tire bead formers is that in the completed tire bead, the inner terminal wire end, that is, the wire end which had been the leading end of the wire, is positioned to lie against the main body of the formed tire bead and in contact with the inside surface of the tire bead ring or body. Referring to FIG. 3, which is an axial plan view of a portion of a tire bead, there is illustrated the small angular relationship between the convolutions of a tire bead 20 being wound on a bead former (such as that shown in FIGS. 1 and 2) and the inner terminal wire end 21 which is gripped by the gripping mechanism of such bead former. When the wound tire bead 20 is removed from the tire bead former, the inner terminal end 21, which had been held by the gripping mechanism, is spaced outwardly of the inner surface 22 of the tire bead. FIG. 3A is a view similar to FIG. 3, but illustrates the manner in which the inner terminal end 21 of the wire is repositioned to engage the inner body 22 of the tire bead after the completed bead has been removed from the bead former. It is believed that such termination wire end placement may be one factor in the failure of the tire bead rings.

In accordance with the present invention, an insert 36 is provided for use with the tire bead former. One such insert is located in each of the forming grooves of the tire bead former so that the first convolutions of wire which form the tire bead are wound on the insert as the tire bead former is rotated. The insert defines a void or cavity in the inner surface of the formed tire bead which is provided to receive the gripping inner terminal end of the wire when it is released from the gripping mechanism as the formed tire bead is being removed from the tire bead former. For the purpose of illustrating the present invention, there is shown in FIG. 4 a schematic representation of one segment 30 of a collapsible tire bead former which is similar to the tire bead former 10 of FIG. 1.

The tire bead former segment 30 includes a plurality of v-shaped forming cavities or grooves, such as grooves 31 and 32, in its outer surface 33. Tire beads 34 and 34a are located in the grooves 31 and 32, respectively, have been wound on the tire bead former segment 30 in the manner known in the art. By way of example, the tire beads 34 and 38 are single wire beads with a 4-5-6-7-8-7-6-5-4 winding construction. However, the tire beads may have winding constructions other than the one illustrated in FIG. 4, and each of the tire beads may include convolutions of a plurality of wires as is known in the art.

Each of the grooves 31 and 32 includes an insert 36 provided in accordance with the present invention. Referring additionally to FIGS. 5 and 5A, the insert 36 defines a void or pocket 37 in the inner surface 38 of the wound bead. The void or pocket 37 receives the inner terminal end 39 of the wire after the formed bead is removed from the tire bead former.

Referring to FIGS. 6–9, the insert 36 is a generally ramp-shaped member having a forward end 51, a rearward end 52 and sides 53 and 54. End 51 defines the leading edge 51a and end 52 defines the trailing edge 52a of the insert. The member has an inclined arcuate upper surface 55 which slopes upwardly from its leading edge 51a to its trailing edge 52a. Side 54 extends vertically higher than side 53, defining a shoulder 56 which has an inclined arcuate upper surface 56a which elopes upwardly from the leading edge 51a to the trailing edge 52a. The void 37 is defined by the shoulder 56 of side 54. One insert that was used with a tire bead former designed to produce a tire bead having a nominal diameter of 16 inches was 0.802 inch in length from its leading edge 81a to its trailing edge 52a and had an overall width between sides 53 and 54 of 0.215 inch. The width "w" of the side 54 was 0.060 inch. The height "h" of the end was 0.215 inch. The radius of curvature $r_1$ of surface 55 was 8.101 inches and the radius of curvature $r_2$ of surface 56a was 3.035 inches. The member was made of D2 tool steel, vacuum hardened to RC 55–58.

Referring to FIG. 10, there is illustrated a simplified representation of one segment 30 of a collapsible tire bead former including the insert 36 in accordance with the present invention. The inner terminal end 14a of a wire 14 is located in a position rearward of the insert 36 to be gripped by the gripping mechanism. FIG. 11, which is a sectional view of the tire bead former segment 30 of FIG. 10, illustrates the gripping mechanism 12 and shows a formed tire bead similar to those shown in FIG. 4. The gripping mechanism 12, shown only in FIG. 11, is insertable into the opening 13 in segment 30 (FIG. 10) and is located rearward of the trailing edge 52 of the insert 36 and radially inward. In FIG. 11, the gripping mechanism is shown in its extended or gripping position, gripping the inner terminal end 14a of the wire 14. The gripping mechanism grips the inner terminal end 14a of the wire 14 as the segment 30 is rotated relative to a source of wire during the tire bead forming operation.

Referring to FIGS. 4, 10 and 11, the gripping mechanism 12 locates the inner terminal end 14a of the wire 14 beneath side 54 of the insert 36. As the gripping mechanism 12 and the insert 36 mounted on the former segment 30 are rotated counterclockwise (or clockwise), the wire is drawn onto the former segment 30 with the first turn 35a of the first convolution having its terminal end 14a held by the gripping mechanism 12 and being wound on the former segment 30 starting rearwardly of the insert 36. The second turn 35b of the first convolution is wound on surface 55 of the insert 36 alongside shoulder 56 of side 54. Turns 35c and 35d of the first convolutions are wound on surface 55 of the insert 36 in side-by-side relation with turn 35b and the shoulder 56 to complete the first convolution. Then, the five turns 36a–36e which make up the second convolution are wound on the first convolution. The first turn 36a of the second convolution is wound partially on the shoulder 56 of the insert 36. The second turn 36b is wound partially on the shoulder 56 and partially on turn 35a of the first convolution. The remaining turns 36c–36e are wound on the turns of the first convolution. Additional convolutions are wound on convolutions 35 and 36 in the manner known in the art to form the complete tire bead which is illustrated in FIG. 11.

FIG. 12 and FIG. 13 show the wire end released from the gripping mechanism and after it has flexed into the space created by the insert 36. FIG. 12 illustrates only turns 35a and 36a, showing how the inner terminal end flexes upwardly from its gripped position, represented by phantom lines, to be positioned in the inner surface of the formed tire bead. As shown in FIG. 13, the inner terminal end 14a is aligned with turns 35b–35d which form the inner surface of the formed tire bead.

When the desired number of convolutions has been wound, the rotation of the tire bead former 1 is stopped and the outer terminal end (not shown) is severed from the supply of wire. Then the tire bead former is collapsed and the gripping means 12 is operated to release the inner terminal end 14a. The wound bead is removed from the tire bead former with the inner terminal end repositioned to be located in the void 37 defined by the insert 36.

Thus, the present invention provides an insert 36 for use with a tire bead former. An insert is located in each of the forming grooves of the tire bead former so that the first convolutions of the wire, which form the tire bead, are wound on the insert as the tire bead former is rotated. The insert has an upstanding shoulder portion which defines a void or cavity in the inner surface of the formed tire bead. The void receives the gripped inner terminal end of the wire when the formed tire bead is removed from the tire bead former. This results in a tire bead ring having improved breaking, load and tensile strength efficiency due to the improved positioning of the inner termination end of the wound tire bead in a cavity provided in the inner surface of the tire head by the presence of the insert while the tire bead is being formed.

I claim:

1. Tire bead forming apparatus comprising:
   a) a rotatable bead former having at least one forming cavity for receiving a plurality of convolutions of the tire bead wire; and
   b) an insert comprising a generally ramp-shaped member having a leading edge, a trailing edge, including an outer surface which is inclined upwardly from said leading edge to said trailing edge, and a sidewall portion adjacent to one side of said inclined surface and extending upwardly therefrom, said member being mounted on said bead former in a position such that, upon rotation of the bead former, the tire bead forming wire wound on said bead former is wound on said member and said sidewall portion, with said sidewall portion defining a void in the inside surface of a formed tire bead for receiving the inner termination end portion of the wire after the wound bead has been removed from the bead former to provide a tire bead having a substantially uniform inside surface.

2. The apparatus according to claim 1 wherein said at least one forming cavity has a predetermined radius of curvature and said inclined surface of said member has a radius of curvature equal to said predetermined radius of curvature.

3. The apparatus according to claim 1 wherein the length of said opening in the inside surface of the formed tire bead is greater than the length of the inner termination end of the wire.

4. In a tire bead forming apparatus, the combination comprising:
   a) a rotatably mounted bead former including at least one forming cavity having a bottom for receiving a plurality of convolutions of a length of wire as the bead former is rotated about an axis during a bead forming operation to provide a tire bead ring having an inside surface and an outside surface;
   b) gripping means structurally associated with said at least one cavity for gripping the inner termination end of the wire during the bead forming operation; and
   c) an insert including a generally ramp-shaped member located in the cavity and having a leading edge and a trailing edge, said ramp-shaped member including a surface inclined upwardly from said leading edge to said trailing edge and with a sidewall portion adjacent to one side of said inclined surface and extending upwardly therefrom, said member being mounted in the bottom of said forming cavity, whereby the turns of the first convolution are wound on said member and said sidewall, with said sidewall portion providing a void in the inside surface of the wound tire bead for receiving the gripped inner termination end portion of the wire after the wound bead has been removed from the bead former to provide a tire bead ring having a substantially uniform inside surface.

5. The apparatus according to claim 4 wherein said at least one forming cavity has a predetermined radius of curvature and wherein said inclined surface of said member has a radius of curvature corresponding to the radius of curvature of said at least one forming cavity.

6. The apparatus according to claim 4 wherein the length of said void in the inside surface of the wound tire bead is greater than the length of the inner termination end portion of the wire.

7. The apparatus according to claim 4 wherein said member is located in said forming cavity adjacent to said gripping means.

8. The apparatus according to claim 7 wherein the width of said member corresponds to the width of said forming cavity.

9. The apparatus according to claim 4 wherein said bead former is comprised of six forming cavities, and six inserts, including an insert for each forming cavity of said bead former.

10. Tire bead forming apparatus comprising:
   a) a bead former having at least one forming cavity for receiving a plurality of convolutions of a length of tire bead forming wire as the bead former is rotated about an axis during a bead forming operation to provide a tire bead ring having an inside surface and an outside surface;
   b) gripping means for gripping the inner termination end of the wire during the bead forming operation; and
   c) an insert comprising a generally ramp-shaped member positioned in said at least one forming cavity and having leading and trailing edges with respect to the direction of rotation of the bead former, said ramp-shaped member including a surface inclined upwardly from said leading edge to said trailing edge and with a sidewall portion adjacent to one side of said inclined surface and extending upwardly therefrom, said member being mounted in said at least one forming cavity such that, upon rotation of the bead former, the turns of the first convolutions of wire are wound on said member and said sidewall portion with said sidewall portion providing an opening in the inside surface of the wound bead for receiving the gripped inner termination end portion of the wire after the wound bead has been removed from the bead former to provide a tire bead having a substantially uniform inside surface.

11. The apparatus according to claim 10 wherein said at least one forming cavity has a predetermined radius of curvature and said inclined surface of said member has a radius of curvature equal to said predetermined radius of curvature.

12. The apparatus according to claim 10 wherein the length of said opening in the inside surface of the wound bead is greater than the length of the inner termination end of the wire.

13. The apparatus according to claim 10 wherein said member is oriented in said at least one forming cavity adjacent to said gripping means.

14. The apparatus according to claim 13 wherein said member has a width corresponding to the width of said at least one forming cavity.

15. The apparatus according to claim 10 wherein said bead former has six forming cavities, there being six inserts, one insert for each forming cavity of the bead former.

16. The apparatus according to claim 10 wherein said member is made from heat treated material.

\* \* \* \* \*